(12) United States Patent
Nguyen et al.

(10) Patent No.: US 6,501,512 B2
(45) Date of Patent: Dec. 31, 2002

(54) METHOD AND APPARATUS FOR AUTOMATIC CALIBRATION OF ANALOG VIDEO CHROMAKEY MIXER

(75) Inventors: Julien T. Nguyen, Saratoga, CA (US); Alain Doreau, Fremont, CA (US); Aurelia Popa-Radu, Dublin, CA (US)

(73) Assignee: Sigma Designs, Inc., Milpitas, CA (US)

( * ) Notice: Subject to any disclaimer, the term of this patent is extended or adjusted under 35 U.S.C. 154(b) by 0 days.

(21) Appl. No.: 09/900,529

(22) Filed: Jul. 6, 2001

(65) Prior Publication Data

US 2002/0021370 A1 Feb. 21, 2002

Related U.S. Application Data

(63) Continuation of application No. 09/655,990, filed on Sep. 6, 2000, now Pat. No. 6,275,269, which is a continuation of application No. 08/828,844, filed on Sep. 30, 1996, now Pat. No. 6,124,897, which is a continuation-in-part of application No. 08/268,764, filed on Jun. 28, 1994, now Pat. No. 5,528,309.

(51) Int. Cl.[7] .................................................. H04N 9/75
(52) U.S. Cl. ...................................... 348/592; 348/587
(58) Field of Search ................................ 348/592, 586, 348/587, 584, 590, 591, 598, 578, 518; H04N 9/74, 9/75

(56) References Cited

U.S. PATENT DOCUMENTS

| | | |
|---|---|---|
| 3,986,204 A | 10/1976 | Smith |
| 4,092,673 A | 5/1978 | Adams |
| 4,122,490 A | 10/1978 | Lish |
| 4,425,581 A | 1/1984 | Schweppe et al. |
| 4,498,098 A | 2/1985 | Stell |
| 4,523,227 A | 6/1985 | Hurst |
| 4,580,165 A | 4/1986 | Patton et al. |
| 4,675,612 A | 6/1987 | Adams et al. |
| 4,680,622 A | 7/1987 | Barnes et al. |
| 4,713,621 A | 12/1987 | Nakamura et al. |
| 4,811,084 A | 3/1989 | Belmares-Sarabia et al. |
| 4,814,879 A | 3/1989 | McNeely |

(List continued on next page.)

FOREIGN PATENT DOCUMENTS

| | | |
|---|---|---|
| EP | 0384257 | 2/1990 |
| EP | 0597616 | 5/1994 |
| JP | 5304638 | 1/1995 |
| WO | WO 96/01027 A1 | 1/1996 |

OTHER PUBLICATIONS

Aura Vision. "An P82 Direct Overlay Video Enhancer". Design Specification & Register Manual. Version 1.00. Sep. 11, 1996.

Todd Brunhoff. "VEX Provides Mechanism for Integrating Graphics and Video". Computer Technology Review. Fall, 1990.

Chrontel. "Triple 8–bit DAC–MUX with Genlock PLL & Analog Color Key". Rev. 0.4, May 29, 1996.

*Primary Examiner*—Michael Lee
(74) *Attorney, Agent, or Firm*—Swernofsky Law Group PC

(57) ABSTRACT

An improved technique for mixing picture signals directed at a monitor screen. Two analog video signals (such as an analog VGA input and an analog RGB signal produced in response to a stored digital still or moving image) may be multiplexed in analog form. An analog chromakey mixer detects a background color in the first video signal (such as the analog VGA input), and replaces the portion of that first video signal with the second video signal. The time delays of the first video signal and the second video signal may be adjusted so that they reach the monitor screen (by means of an a multiplexer output) at the same time. An alignment detector may attempt to align two known signals (such as a VGA sync signal and a signal generated for this purpose), and may adjust a set of time delays in the analog chromakey mixer until the time difference between the first and second video signals falls below a threshold.

19 Claims, 12 Drawing Sheets

U.S. PATENT DOCUMENTS

| | | |
|---|---|---|
| 4,827,344 A | 5/1989 | Astle et al. |
| 5,309,111 A | 5/1994 | McNeely et al. |
| 5,398,075 A | 3/1995 | Freytag et al. |
| 5,528,309 A | 6/1996 | Nguyen |
| 5,612,743 A | 3/1997 | Lee |
| 5,719,511 A | 2/1998 | Le Cornec et al. |
| 5,821,947 A | 10/1998 | Nguyen |
| 6,124,897 A | 9/2000 | Nguyen et al. |
| 6,275,269 B1 | 8/2001 | Nguyen et al. |

METHOD AND APPARATUS FOR AUTOMATIC CALIBRATION OF ANALOG VIDEO CHROMAKEY MIXER

CROSS-REFERENCE TO RELATED APPLICATIONS

This is a continuation of application Ser. No. 09/655,990, filed Sep. 6, 2000, now U.S. Pat. No. 6,275,269 which is itself a continuation of application Ser. No. 08/828,844 filed Sep. 30, 1996 and issued as U.S. Pat. No. 6,124,897 which is a continuation-in-part of appl. Ser. No. 08/268,764, filed Jun. 28, 1994, now U.S. Pat. No. 5,528,309, issued Jun. 18, 1996.

Claims priority of PCT application PCT/US95/08279, "Analog Video Chromakey Mixer", filed Jun. 27, 1995, which itself claims priority of U.S. patent application Ser. No. 08/268,764, "Analog Video Chromakey Mixer", filed Jun. 28, 1994, in the name of inventor Julien T. Nguyen, now U.S. Pat. No. 5,528,309, issued Jun. 18, 1996, hereby incorporated by reference as if fully set forth herein.

BACKGROUND OF THE INVENTION

1. Field of the Invention

This invention relates generally to an analog video chromakey mixer and to a method for calibrating and using the same.

2. Description of Related Art

When still or moving images in digital form are displayed in a computer system, the digital images must generally be decoded and displayed as images on a computer monitor screen. Typically, the monitor screen is the only monitor screen in the computer system. However, those decoded and displayed images must be coordinated with other display signals directed at the same monitor screen, such as those signals directed that the monitor screen by an RGB or VGA monitor driver. Typically, the two sets of signals directed at the monitor screen must be multiplexed in some way.

Generally, it is desired that the two sets of signals must be smoothly multiplexed, with no breaks that would be visible to the human eye. It is also generally desired that the two sets of signals should be multiplexed quickly, so that high quality, high speed images may be displayed. It is also generally desired that any method for multiplexing the two sets of signals should work with a wide variety of computer systems and with a minimum of adaptation required for any of them.

However, one problem that has arisen in the art is that high quality, high speed multiplexing of analog and digital video signals can be difficult. For example, if it were desired to digitize the analog video signals and multiplex them with the digital signals entirely digitally, it could require an AID converter that produced 16 million colors (24 bits) at a 75 MHz pixel rate. Present A/D converters do not operate at this combination of precision and speed, at least not at anything near a reasonable cost for a personal computer system.

One method of the prior art has been to multiplex the digital data provided by the computer system's processor (or CPU) to the monitor driver. While this method sometimes achieves the goal of synchronizing digital and analog video sources, it has the drawback that it requires substantial information about the method of color encoding used by the VGA monitor driver. As monitor drivers have been changed with improvements in monitors and in drivers, this method also has the drawbacks that it may fail to work for certain classes of monitor drivers.

Accordingly, it is an object of the invention to provide an improved technique for mixing picture signals directed at a monitor screen.

SUMMARY OF THE INVENTION

The invention provides an improved method for mixing picture signals directed at a monitor screen. In a preferred embodiment, the time delays of the first video signal and the second video signal may be adjusted so that they reach the monitor screen at the same time. An alignment detector may attempt to align two known signals (such as a VGA signal and a video signal), and may adjust a set of time delays until the time difference between the first and second video signals falls below a threshold. Adjustable time delays may include coarse and fine time delays, and may include time delays between any two of-input ports for the first and second video signals, a chromakey detector, an analog multiplexer, and an output port.

BRIEF DESCRIPTION OF THE DRAWINGS

FIG. 48 shows the two signals before coarse adjustment of the frequency of the pixel clock; and FIG. 4C shows the two signals after coarse adjustment.

DESCRIPTION OF THE PREFERRED EMBODIMENTS

System Architecture

Figure 1:
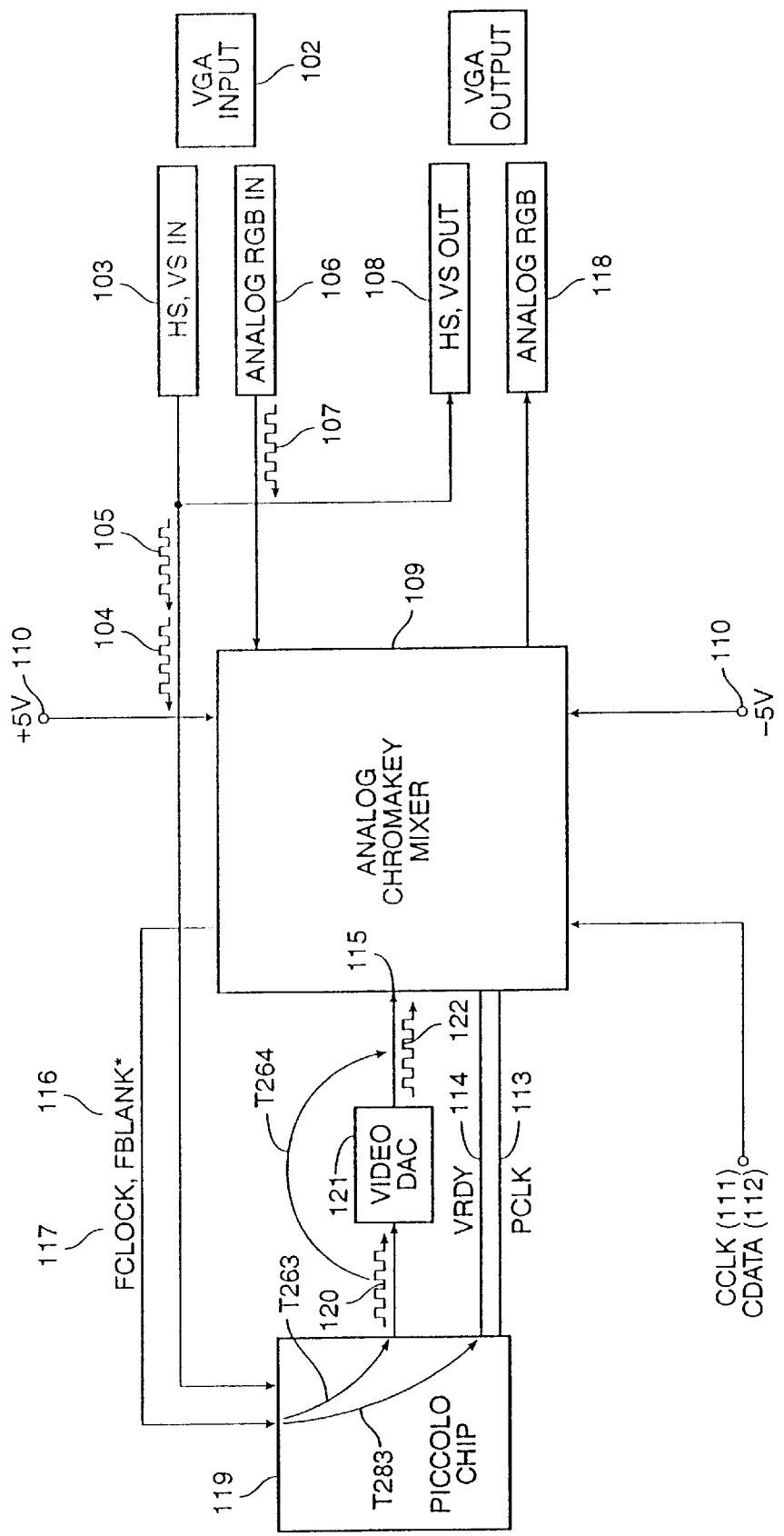
FIG. 1 shows a video system architecture.

FIG. 1 shows a video system architecture.

In a preferred embodiment, a video system 101 embedded in a computer system comprises a VGA input 102, having a sync input 103 for a horizontal sync (HS) signal 104 and a vertical sync (VS) signal 105, and having a first video input 106 for a first analog signal 107 (such as an analog RGB video signal). In a preferred embodiment, the VGA input 102 may be coupled to a VGA monitor driver, such as a personal computer system comprising a monitor driver card or another monitor driver circuit. VGA monitor drivers are known in the art. The sync input 103 is coupled to a sync output 108.

The sync input 103 and the first analog signal 107 are coupled to an analog chromakey mixer 109, which detects a key color in the analog RGB video signal and multiplexes the first analog signal 107 with a second analog RGB signal.

The analog chromakey mixer 109 is coupled to a set of reference voltages 110, comprising a +5 volt source and a −5 volt source in a preferred embodiment, to a CCLK signal 111 and a CDATA signal 112, for communication with the computer system, to a PCLK signal 113 and a VRDY signal 114, and to a second video input 115. The analog chromakey mixer 109 provides an output FBLANK signal 116 and an output FCLOCK signal 117, and a video output 118.

The sync input 103 is coupled to a digital signal processor (DSP) 119, which provides a digital video signal 120 having a sequence of digital pixels. The DSP 119 is coupled to the FBLANK signal 116 and the FCLOCK signal 117 from the analog chromakey mixer 109. The DSP 119 provides the PCLK signal 113 and the VRDY signal 114.

The digital video signal 120 is coupled to a video D/A converter 121, which converts the digital video signal 120 to a second analog signal 122 having a sequence of analog pixels. The second analog signal 122 is coupled to the analog chromakey mixer 109 at the second video input 115.

System Operation

In a preferred embodiment, the HS signal 104 and the VS signal 105 provide sync information for the first analog signal 107, and for the multiplexed video signal coupled to the video output 118.

The analog chromakey mixer 109 is described in further detail with reference to FIG. 2.

The reference voltages 110 provide power and logical references for the analog chromakey mixer 109. Reference voltages are known in the art. In a preferred embodiment, the reference voltages 110 may also be coupled to other circuits for similar purposes.

The CCLK signal 111 and a CDATA signal 112 are for communication with the computer system. These signals are used by the computer system to program voltage reference levels and internal registers of the analog chromakey mixer chip 109. Programming reference levels and internal registers of a chip by means of input signals is known in the art.

The PCLK signal 113 is a clock for VRDY signal 114. The VRDY signal 114 indicates whether a digital pixel in the a digital video signal 120 comprises valid data.

The FBLANK signal 116 provides a composite blanking signal for the DSP 119. The FCLOCK signal 117 provides a pixel clock for the DSP 119.

In a preferred embodiment, the DSP 119 may comprise the Piccolo chip (available from Sigma Designs, Inc., of Fremont, Calif.).

In a preferred embodiment, the digital video signal 120 comprises a sequence of digital pixels, each having 8 bits of precision for each of three colors (red, green, and blue), at a rate of about 20 nanoseconds per digital pixel.

The D/A converter 121 converts each digital pixel to a set of three analog voltages, one for each of three colors. D/A converters are known in the art. In a preferred embodiment, the D/A converter 121 may comprise the BT121 device (available from Brooktree Corporation of San Diego, Calif.).

Analog Chromakey Mixer

Figure 2:
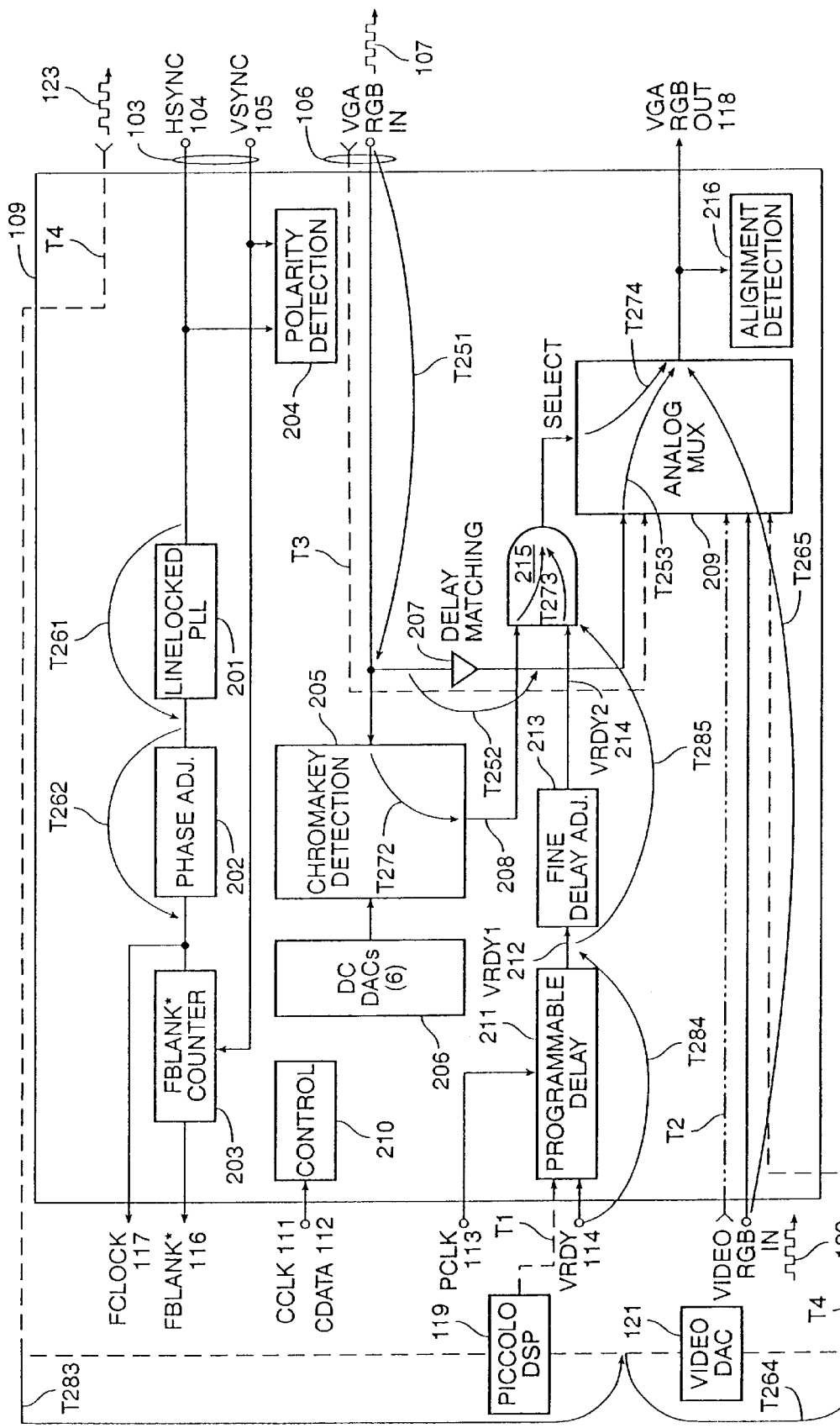
FIG. 2 shows a block diagram of an analog chromakey mixer.

FIG. 2 shows a block diagram of an analog chromakey mixer.

In a preferred embodiment, the HS signal 104 is coupled to a line locked phase locked loop (PLL) 201, which recovers a clock signal from the HS signal 104. Phase locked loops are known in the art. The line locked PLL 201 is coupled to a phase adjuster 202, which provides an adjustable delay. An output of the phase adjuster 202 provides the FCLOCK signal 117. The phase adjuster 202 is coupled to a counter 203, which provides the FBLANK signal 116.

The HS signal 104 and the VS signal 105 are coupled to a polarity detector 204. In a preferred embodiment, the HS signal 104 and the VS signal 105 may have any polarity. The polarity detector 201 uses the FCLOCK signal 117 to sample the HS signal 104; if the same value is sampled for more than 256 consecutive clock pulses, that value is considered to represent the inverse of the polarity of the HS signal 104. Similarly, the polarity detector 201 uses the FCLOCK signal 117 to sample the VS signal 105; if the same value is sampled for more than 256 consecutive clock pulses, that value is considered to represent the inverse of the polarity of the VS signal 105.

The first analog signal 107 is coupled to a chromakey detector 205, which determines whether a present analog pixel of the analog RGB video signal matches the color to be replaced (the chromakey). The chromakey detector 205 is coupled to a set of six D/A converters 206 that provide a set of three minimum/maximum values for the red (R), green (G), and blue (B) color components of the analog RGB video signal. The chromakey detector 205 determines a color match when the detected color falls within the minimum/maximum values for all three color components, and generates a match signal 208.

The first analog signal 107 is coupled by means of a delay 207 to a first input of an analog multiplexer 209.

The CCLK signal 111 and the CDATA signal 112 are coupled to a control circuit 210, for programming voltage reference levels and internal registers of the analog chromakey mixer chip 109. Programming reference levels and internal registers of a chip by means of input signals is known in the art.

The PCLK signal 113 is used to clock the VRDY signal 114 to an input of a programmable delay 211, which provides an output VRDY1 signal 212. The VRDY1 signal 212 is coupled to a fine delay 213, which provides an output VRDY2 signal 214. The VRDY2 signal 214 is coupled to an input of a logical AND gate 215.

The match signal 208 is coupled to another input of the logical AND gate 215. An output of the logical AND gate 215 is coupled to a select input of the analog multiplexer 209. The second analog signal 122 is coupled to a second input of the analog multiplexer 209. An output of the analog multiplexer 209 is coupled to the video output 118.

Analog Chromakey Mixer Operation

In a preferred embodiment, the chromakey detector 205 detects the chromakey in the first analog signal 107; the match signal 208 indicates that the chromakey detector 205 found a match. When a match is found, at the next valid pixel from the D/A converter 121, the match signal 208 and VRDY signal 114 will both be logical "1", and the logical AND gate 215 will cause the analog multiplexer 209 to select the second analog signal 122 instead of the first analog signal 107. This mixing operation requires a series of calibration steps to ensure that the two signals mix seamlessly, thereby avoiding offset or blurred images of the combined signals as displayed on a monitor. Note that VRDY 114 is triggered whenever the second video signal 123, such as an MPEG video stream comprised of signals 120 and 122, is available for D/A conversion, mixing, and display.

Seamless Mixing and Synchronization

Achieving seamless mixing of the two analog signals 107, 122 requires synchronizing control signal VRDY 114 with video signal 123 which travel down paths t1 and t2, respectively; and synchronizing first analog signal 107 with second signal 122 which travel along paths t3 and t4, respectively.

Synchronizing control signal VRDY 114 with video signal 122 is achieved by introducing adjustable delays along path t1. Time delays t284, t285, t273, t274 comprise the cumulative time delay for path t1, where programmable delay 211 and fine delay adjustment 213 provide adjustable time delays t284, t285. Time delays t264, t265 comprise the cumulative time delay for path t2 and are not adjustable. Since the two signals are mixed only when the logical AND gate 215 is triggered by match signal 208 and VRDY1 212, VRDY 114 must be delayed sufficiently along path t1 to allow the digital video signal to "catch-up" or arrive at the mulitiplexer at the moment VRDY 114 triggers logical AND gate 215. Consequently, programmable delay 211 and fine delay adjustment 213 are used to delay VRDY 114 along path t1 by producing adjustable delay times t284 and t285, respectively.

Synchronizing the VGA signal 107 with the video signal 123 is achieved by introducing adjustable delays serially along paths t3 and t4. Time delays t251, t252, and t253 comprise the cumulative time delay for path t3, with delay matching 207 providing time delay t252 which is adjustable. Time delays t261, t262, t283, t264 and t265 comprise the cumulative time delay for path t4. Time delay t262 is adjustable and is provided by phase adjustment 202.

For each of the adjustable time delay elements, including programmable delay 211, fine delay adjustment 213, delay matching 207, and phase adjustment 202, a register (not shown) is provided for setting the amount of time delay required for synchronization. Each of the registers can be adjusted to provide or can receive a time delay amount by external means.

Calibration

In the following description, a preferred embodiment of the calibration techniques used in the invention is described with regard to preferred process steps and data structures. However, those skilled in the art would recognize, after perusal of this application, that embodiments of the invention may be implemented using a general purpose processor coupled to a memory and operating under program control, or other suitable test equipment, which selects signals and data for use by apparatus shown in FIG. 1 and FIG. 2, and that modification of a general purpose processor to implement the process steps and data structures described herein would not require undue invention.

Figure 4A:
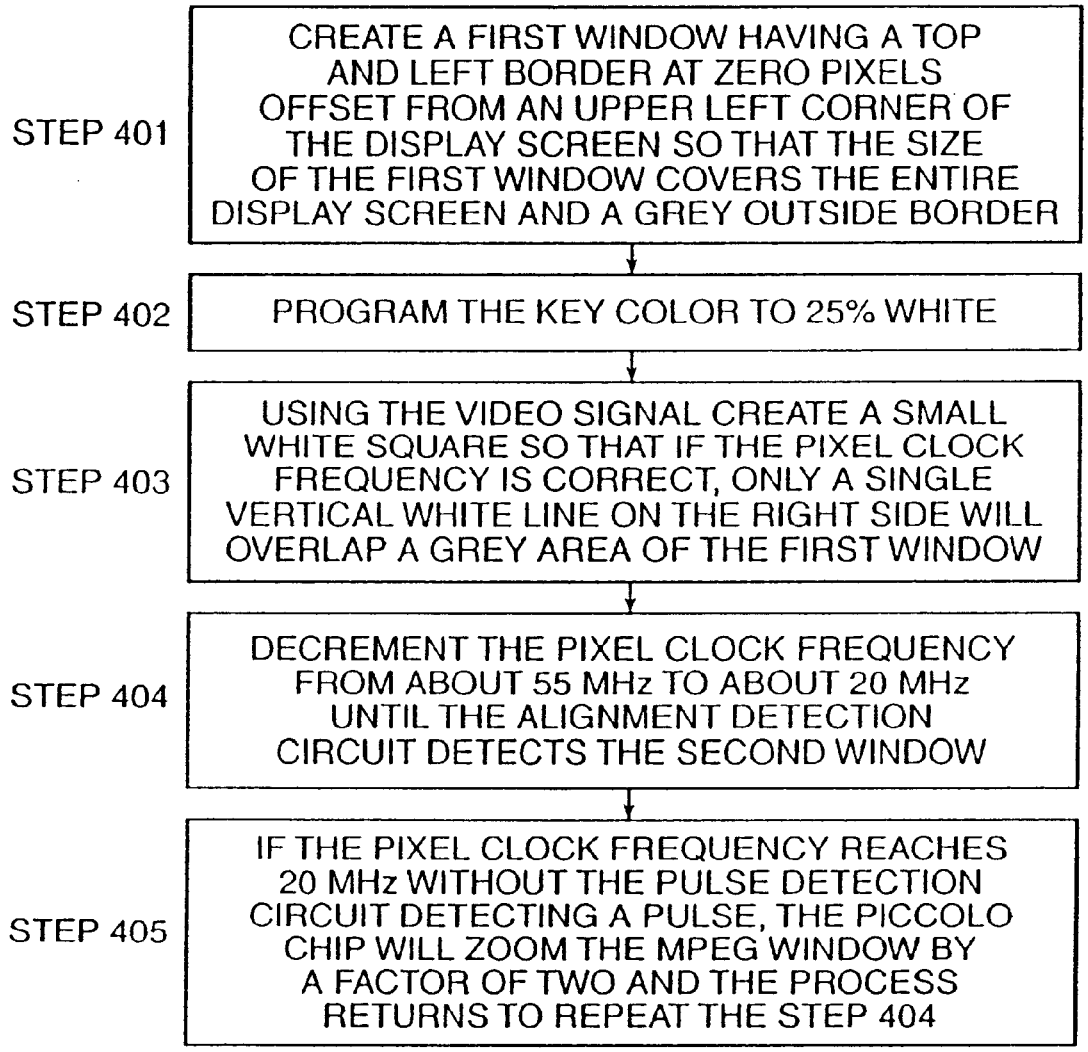
FIG. 4A shows a flowchart for mixing a VGA signal with a video signal to perform the pixel clock frequency calibration.
Figure 4B:
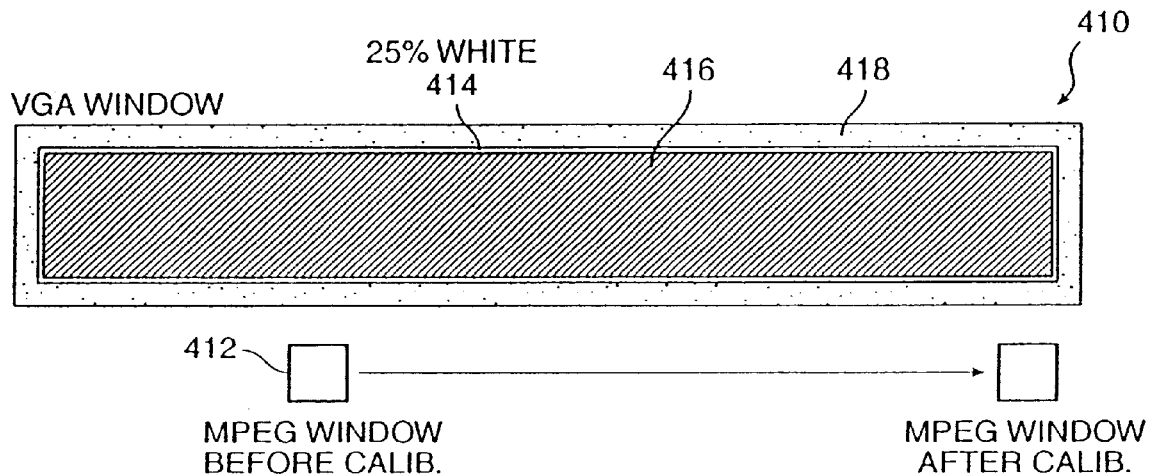
FIGS. 4B and 4C show a VGA signal comprising a uniformly black VGA signal for filling a first window, and a video signal comprising a uniformly white for filling a second window 412.
Figure 4C:
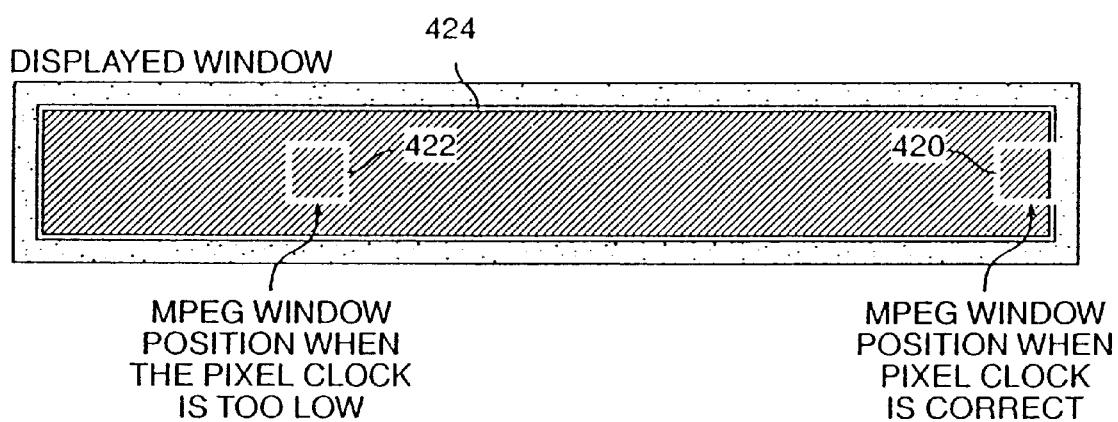

For example, as described in further detail with regard to FIG. 4A, FIG. 4B, and FIG. 4C, the processor tests the chromakey detector 205 by selecting one or more digital values for input to the D/A converters 206 and storing those selected digital values in registers used by the D/A converters 206. Storing selected digital values in registers is known in the art of semiconductor chip design.

Figure 6B:
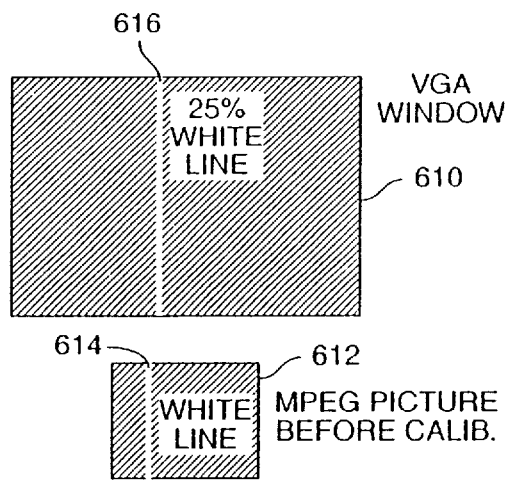
FIG. 6B shows a VGA signal comprising a uniformly black VGA signal for filling a first window, and the video signal 123 comprising a uniformly black MPEG signal for filling a second window before the fine adjustment of the left border and the synchronization of the VGA signal with the video signal 123.
Figure 6C:
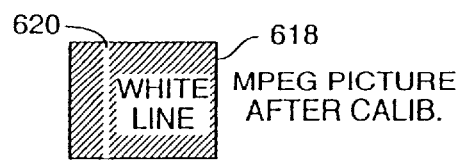
FIG. 6C shows the two signals after the fine adjustment of the left border and the synchronization of the VGA signal 107 with the video signal 123.
Figure 6A:
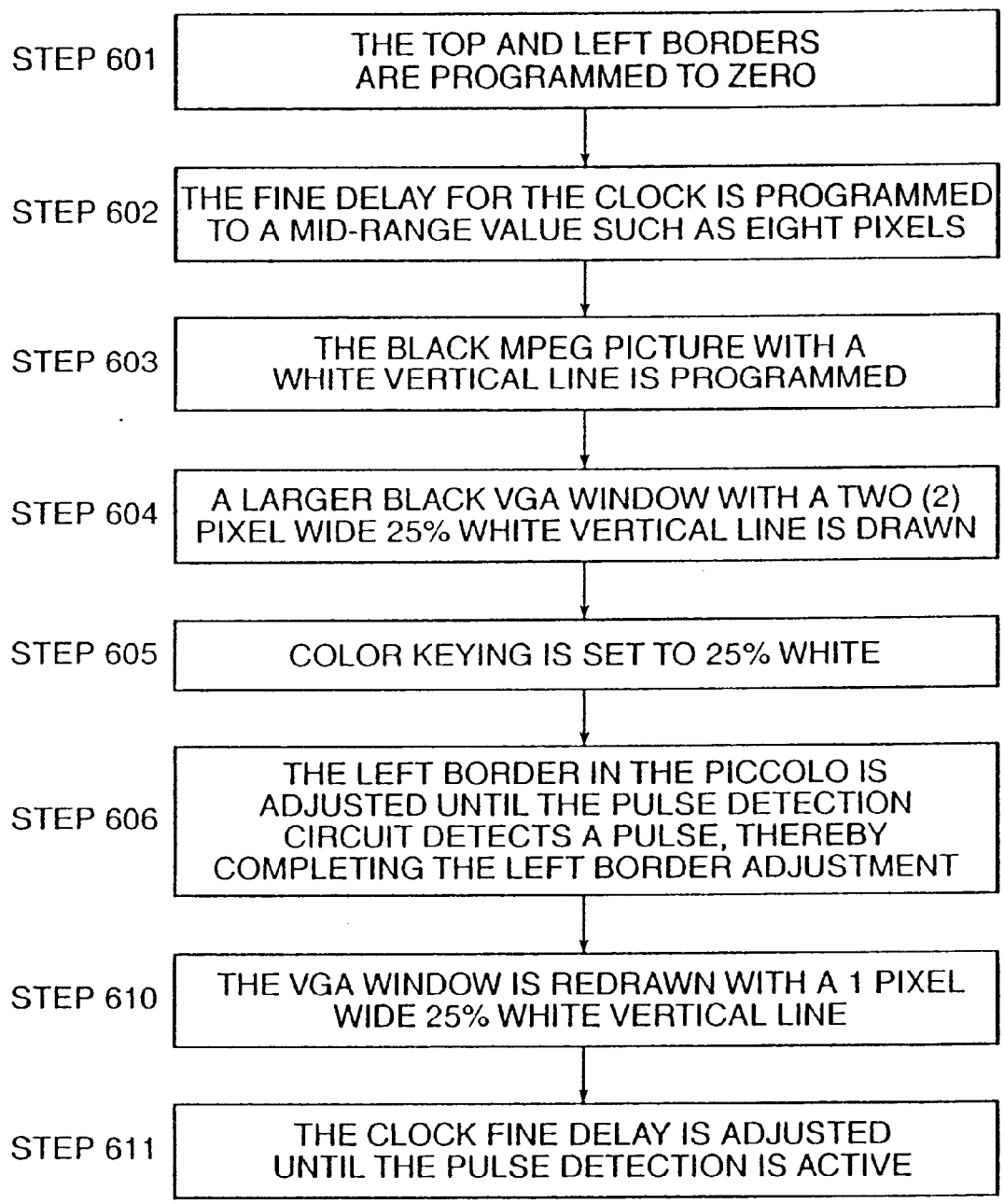
FIG. 6A shows a flowchart for vertical synchronization.

For another example, as described in further detail with regard to FIG. 6A and FIG. 6B, as well as with regard to FIG. 7A and FIG. 7B, and FIG. 8A and FIG. 8B, the processor tests the synchronization of VGA input signals with video input signals by selecting VGA input signals to be presented at the "VGA RGB in" node and by selecting video input signals to be presented at the "video RGB in" node. In a preferred embodiment, the selected VGA input signals and the selected video input signals are retrieved from the memory and transmitted from the processor to the "VGA RGB in" node and to the "video RGB in" node. Selecting and transmitting VGA or video signals from a processor to an input node is known in the art.

Figure 3A:
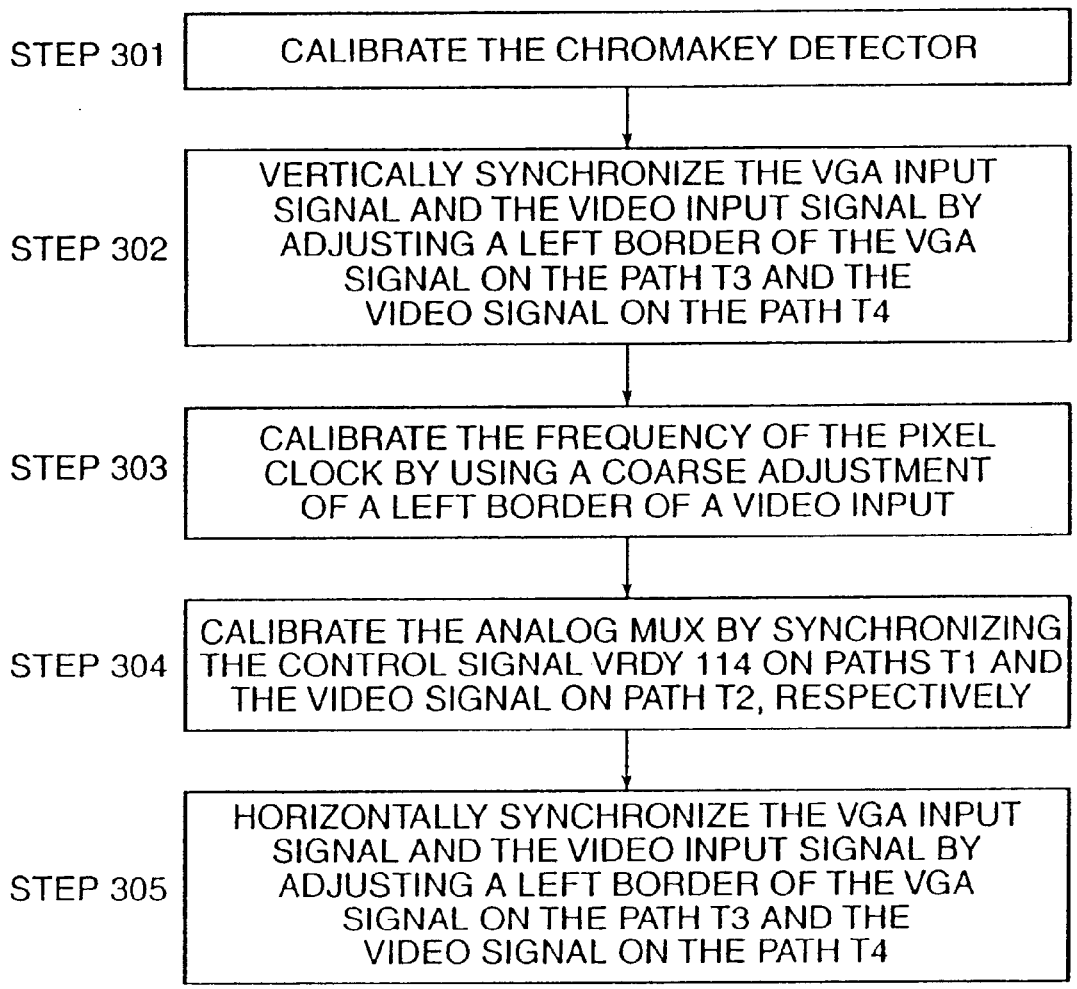
FIG. 3A shows a preferred calibration process.

FIG. 3A shows a preferred synchronization process.

At a step 301, the chromakey detector 205 is calibrated by selecting a chromakey having a selected white level (thus, a shade of grey), and by presenting a set of VGA input signals having selected white levels, and by detecting the resultant first analog signal 107. The step 301 is described in further detail with regard to FIG. 3B.

At a step 302, the frequency of the pixel clock PCLK 113 is calibrated by coarse adjustment of a left border of a video input. The step 302 is described in further detail with regard to FIG. 4A and FIG. 4B and FIG. 4C.

At a step 303, the analog mux 209 is calibrated by synchronizing the control signal VRDY 114 on path to and the video signal 123 on path t2, respectively. The step 303 is described in further detail with regard to FIG. 5A and FIG. 5B.

At a step 304, the VGA input signal and the video input signal are vertically synchronized by adjusting a left border of the VGA signal 107 on the path t3 and the video signal 123 on the path t4. The step 304 is described in further detail with regard to FIG. 6A, FIG. 6B and FIG. 6C.

At a step 305, the VGA input signal and the video input signal are horizontally synchronized by adjusting a left border of the VGA signal 107 on the path t3 and the video signal 123 on the path t4. The step 304 is described in further detail with regard to FIG. 7A, FIG. 7B and FIG. 7C.

Chromakey Detector Calibration

Figure 3B:
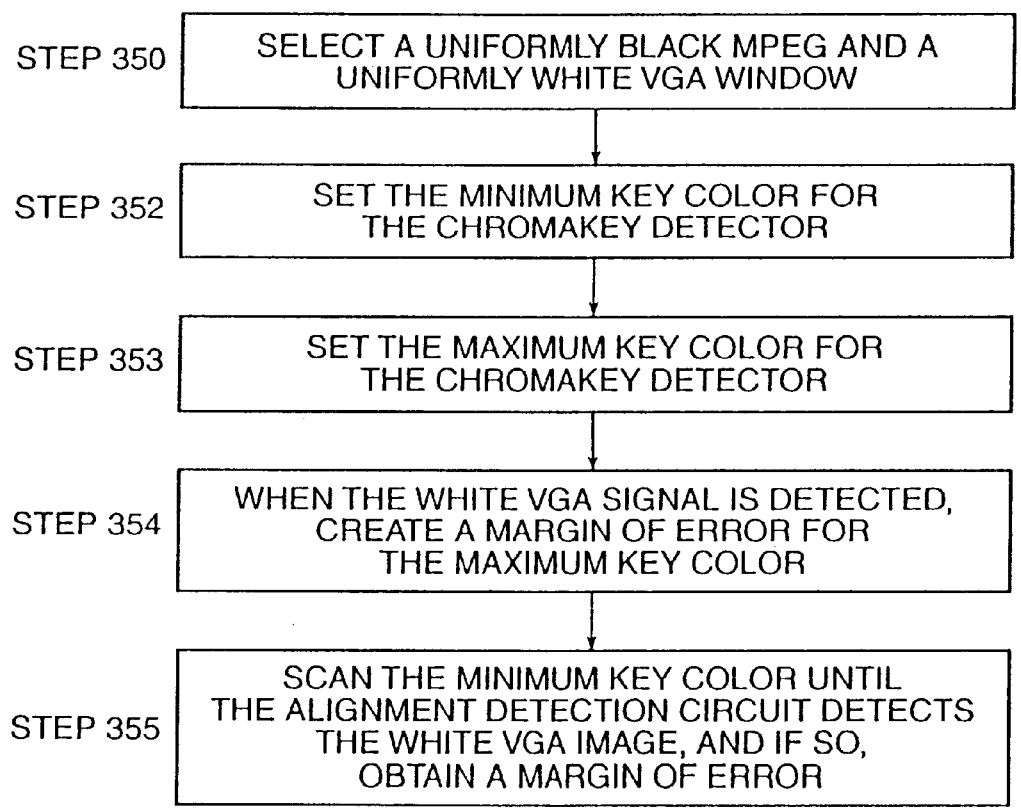
FIG. 3B shows a flowchart for mixing the first video signal 107 and the second video signal 123.

FIG. 3B shows a flowchart for mixing the VGA signal 107 and the video signal 123.

Figure 3C:
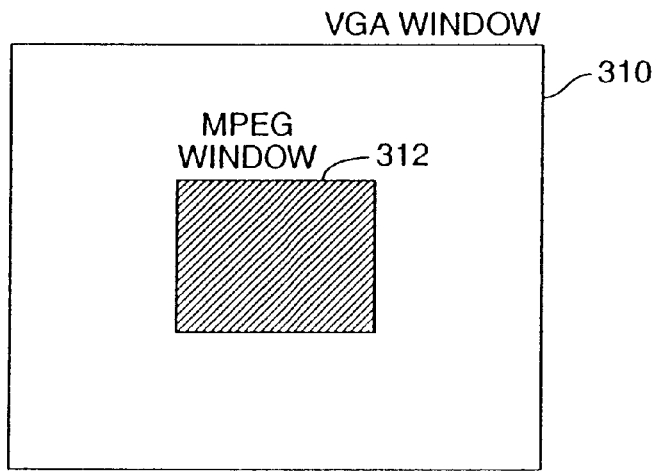
FIG. 3C shows a set of display screens before and after chromakey detector calibration.

FIG. 3C shows a set of display screens before and after chromakey detector calibration.

The VGA signal 107 comprises a VGA signal filling a rectilinear window on the display screen; this VGA signal is uniformly black in color (thus, it has red, green, and blue components each equal to zero). The video signal 123 comprises an MPEG video signal which is also uniformly black in color.

As used herein, the term "window" includes any set of VGA or video data sized to fit in a selected set of pixels on the screen. Video data includes any stream of selected pixel data such as a pixel stream in the MPEG format.

In a preferred embodiment, the following steps are performed as part of chromakey detector calibration.

At a step 350, a uniformly black MPEG image is selected for input as the video signal 123, for filling a first window 312, and a uniformly white VGA image is selected for input as the VGA signal, for filling a second window 310.

At a step 352, the minimum key color for the chromakey detector 205 is set to zero. Thus, the minimum red color at the D/A converter 206 is set to zero, the minimum green color at the D/A converter 206 is set to zero, and the minimum blue color at the D/A converter 206 is set to zero.

At a step 353, the maximum key color for the chromakey detector 205 is set to 128 (thus, the maximum key colors for red, green, and blue at the D/A converter 206 are each set to 128), and the alignment detection circuit 216 is examined to determine if the white VGA image is detected. The maximum key color is repeatedly incremented from 128 to its maximum possible value of 255 until the alignment detection circuit 216 detects the white VGA image.

At a step 354, if the white VGA image signal was detected, the maximum key color is further incremented a few more steps (such as about 2 to about 4 steps out of 256 possible steps) to obtain a margin of error.

At a step 355, the minimum key color is similarly scanned from 0 to 255 until the alignment detection circuit 216 detects the white VGA image, and if so, decremented a few more steps (such as about 2 to about 4 steps) to obtain a margin of error.

Pixel Clock Frequency Calibration

FIG. 4A shows a flowchart for mixing the VGA signal 107 with the video signal 123 to perform the pixel clock frequency calibration.

FIGS. 4B and 4C show the VGA signal 107 comprising a uniformly black VGA signal for filling a first window 410, and the video signal 123 comprising a uniformly white signal for filling a second window 412. The second window 412 comprises a small white square. FIG. 4B shows the two signals before coarse adjustment of the frequency of the pixel clock PCLK 113; FIG. 4C shows the two signals after coarse adjustment.

In a preferred embodiment, the following steps are performed as part of coarse adjustment of the frequency of the pixel clock PCLK 113.

At a step 401, the VGA signal is selected so that the top and left border of the first window 410 are aligned with (thus, offset zero pixels from) from an upper left corner of the display screen, and so that the size of the first window 410 covers the entire display screen.

At a step 402, the video signal 123 is selected to comprise a 25% white MPEG signal for filling a second window 412 (thus, the red value for this MPEG signal is 25% of the maximum possible value, the green value is 25% of the maximum possible value, and the blue value is 25% of the maximum possible value). The second window 412 comprises a relatively small white square.

At a step 403, the second window 412 is positioned so that it lies under a black area 416 of the the first window 410, so that if the pixel clock frequency is correct, only a single vertical white line 420 on the right side will overlap a grey area 418 of the first window 410. Otherwise, if the pixel clock frequency is too low, the second window 412 will be at a (detectable) position 422 within the black area 424.

At a step 404, the pixel clock frequency is repeated decremented from about 65 MHz to about 20 MHz, and the alignment detection circuit 216 is examined to determine if it detects the second window 412. When the alignment detection circuit 216 does detect the second window 412, the frequency of the pixel clock PCLK 113 is then known to be approximately correct. In a preferred embodiment, the actual time per frame is determined by averaging over several frames, preferably about twenty frames.

At a step 405, if the pixel clock frequency reaches 20 MHz without the pulse detection circuit detecting a pulse, the Piccolo Chip 119 zooms the MPEG window by a factor of two and the process returns to repeat the step 404.

Analog Mux Synchronization

Figure 5A:
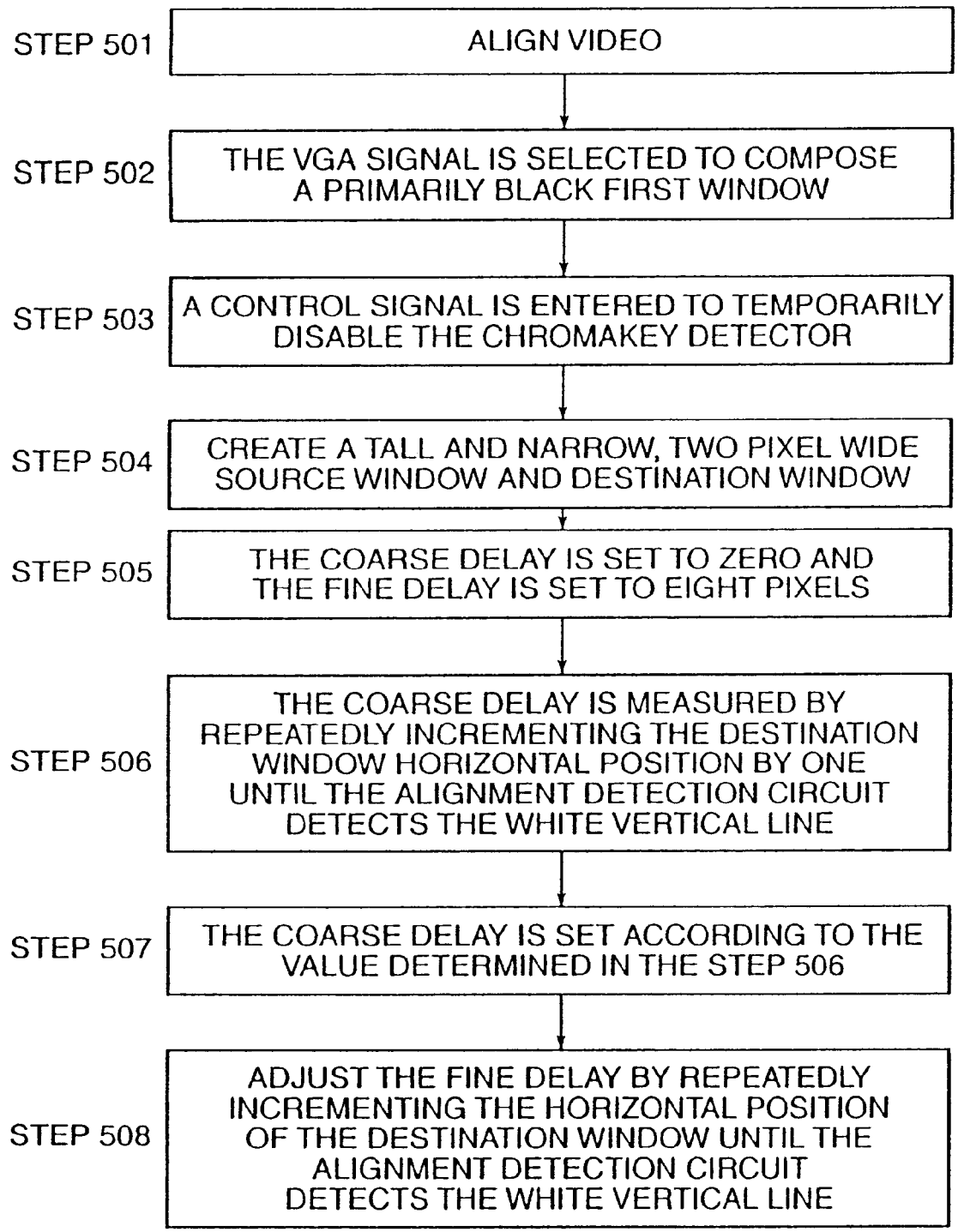
FIG. 5A shows a flowchart for synchronizing the control signal VRDY with a video signal.

FIG. 5A shows a flowchart for synchronizing the control signal VRDY 114 with the video signal 123.

Figure 5B:
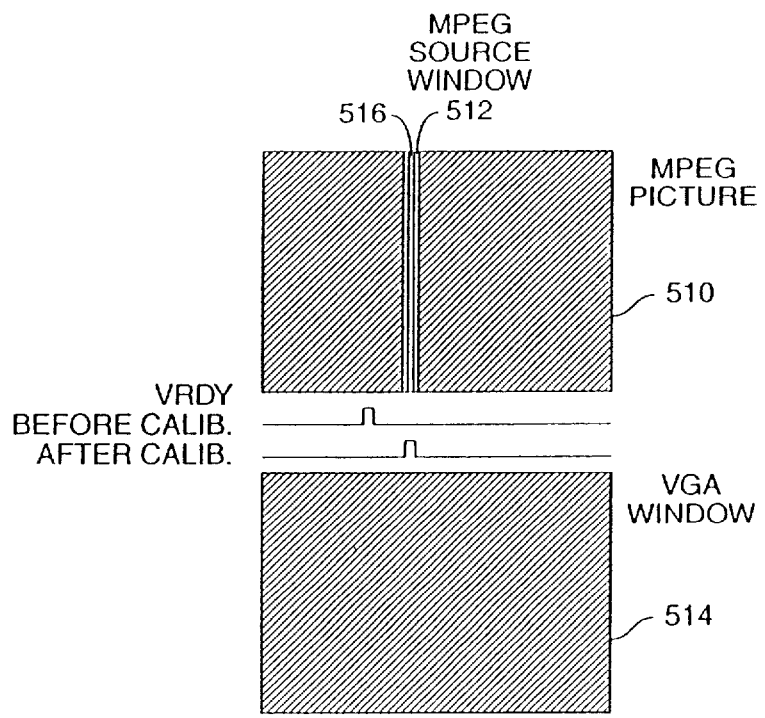
FIG. 5B shows the relative positions of the control signal VRDY before and after synchronization with a video signal on the path t2.

FIG. 5B shows the relative positions of the control signal VRDY 114 before and after synchronization with the video signal 123 on the path t2.

In a preferred embodiment, the following steps are performed as part of synchronizing the control signal VRDY 114 with the second signal 123.

At a step 501, video signal is aligned with the upper left corner (thus, the offsets from the top and left borders are set to zero). The video signal is selected to comprise a primarily black MPEG signal for a first window 510, having a uniformly white vertical line 512 superimposed thereon.

At a step 502, the VGA signal is selected to comprise a primarily black first window 514.

At a step 503, a control signal is entered to temporarily disable the chromakey detector 205.

At a step 504, the video signal is selected so as to comprise a tall and narrow, two pixel wide source window and destination window 516.

At a step 505, the coarse delay t284 is set to zero and the fine delay t285 is set to eight pixels (thus about 320 nanoseconds).

At a step 506, the coarse delay t284 is measured by repeatedly incrementing the destination window horizontal position by one until the alignment detection circuit 216 detects the white vertical line 512. When the white vertical line 512 is detected, the coarse delay t284 is approximately known.

At a step 507, the coarse delay t284 is set according to the value determined in the step 506.

At a step 508, the fine delay t285 is similarly adjusted. The video signal is selected so as to comprise a one pixel wide source and destination window; the horizontal position of the destination window is repeatedly incremented until the alignment detection circuit 216 detects the white vertical line 512. When the white vertical line 512 is detected, the fine delay t285 is known.

Vertical Synchronization

FIG. 6A shows a flowchart for vertical synchronization.

FIG. 6B shows the VGA signal 107 comprising a uniformly black VGA signal for filling a first window 610, and the video signal 123 comprising a uniformly black MPEG signal for filling a second window 612 before the fine adjustment of the left border and the synchronization of the VGA signal 107 with the video signal 123.

FIG. 6C shows the two signals after fine adjustment of the left border and synchronization of the VGA signal 107 with the video signal 123.

In the preferred embodiment, adjustment of the left border and synchronization of the VGA signal 107 with second video signal 123 include the following steps.

At a step 601, the VGA signal 107 is aligned with the upper left corner of the display screen (thus, the offsets from the top and left borders are set to zero).

At a step 602, the fine delay t285 for the clock is programmed to a mid-range value such as eight pixels (thus, about 320 nanoseconds).

At a step 603, the video signal 123 is selected to comprise a primarily black MPEG picture 612 with a white vertical line 614.

At a step 604, the VGA signal 107 is selected to comprise a larger black VGA window 610 with a two pixel wide 25% white vertical line 616.

At a step 605, the chromakey detector is set to use a chromakey of 25% white (thus, 25% red, 25% green, and 25% blue).

At a step 606, the left border of the video signal 123 generated by the Piccolo is adjusted until the alignment detection circuit 216 detects a pulse, thereby completing the left border adjustment.

In a preferred embodiment, fine synchronization of the VGA signal 107 with the video signal 123 includes the steps 610 through 611.

At a step 610, the VGA window 610 is redrawn with a 1 pixel wide 25% white vertical line 516.

At a step 611, the clock fine delay t285 is adjusted until the alignment detection circuit 216 detects a pulse.

In the preferred embodiment of the present invention, the adjustments immediately above take place on the left side of the screen, so that any inaccuracy caused by an inaccurate pixel clock frequency will minimize any error.

An MPEG picture 618 with a white horizontal line 620 is shown after completion of the above calibration steps.

Horizontal Synchronization

Figure 7A:
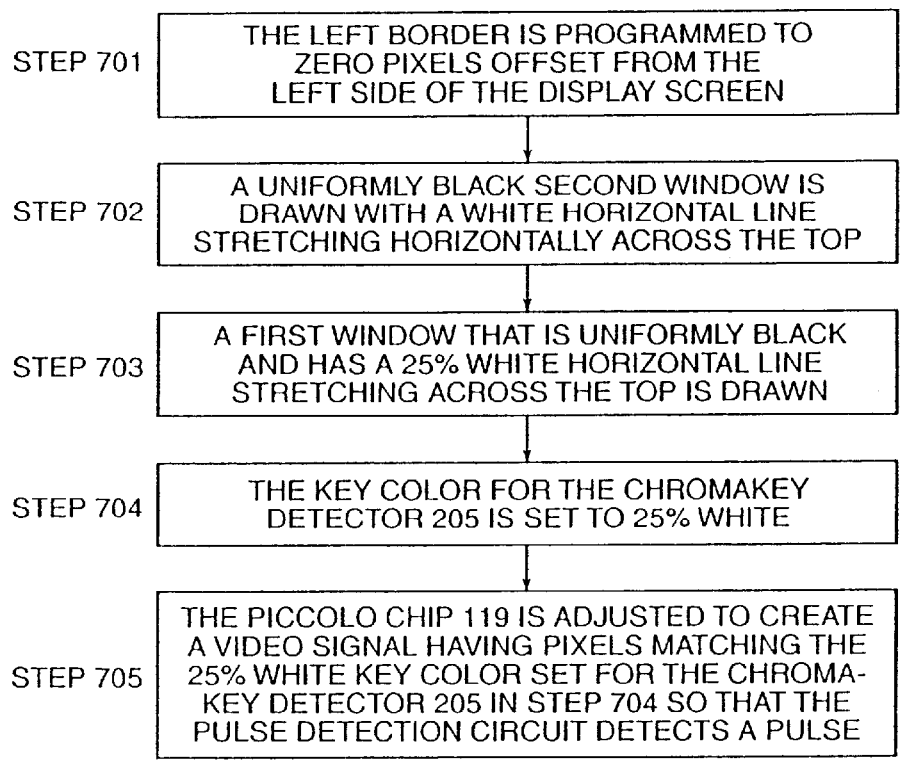
FIG. 7A shows a flowchart for horizontal synchronization.

FIG. 7A shows a flowchart for horizontal synchronization.

Figure 7B:
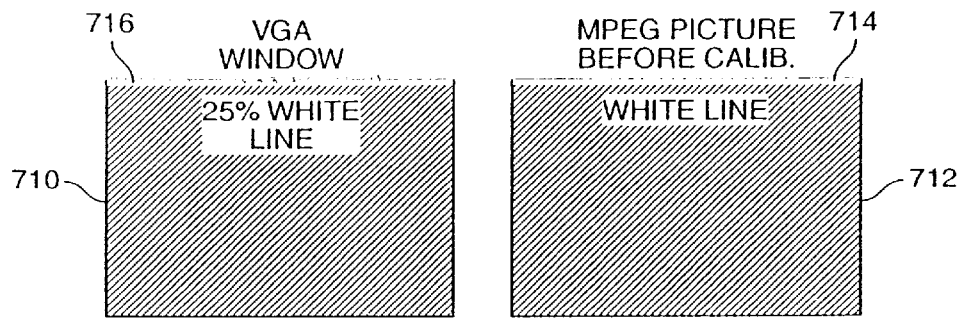
FIG. 7B shows a VGA signal comprising a uniformly black VGA signal for filling a first window, and a video signal 123 comprising a uniformly black second window before the adjustment of the top border.

FIG. 7B shows the VGA signal 107 comprising a uniformly black VGA signal for filling a first window 710, and the video signal 123 comprising a uniformly black second window 712 before the adjustment of the top border.

Figure 7C:
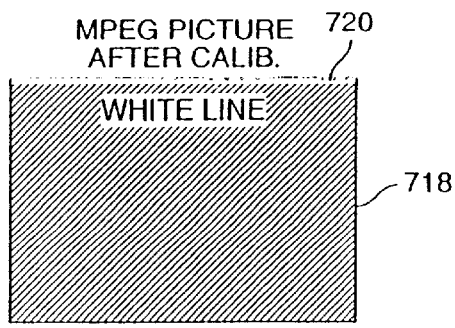
FIG. 7C shows the two windows after the adjustment of the top border.

FIG. 7C shows the two windows after the adjustment of the top border.

In the preferred embodiment, the following steps are performed as part of the adjustment of the top border 710.

At a step 701, the left border is programmed to zero by selecting a VGA signal 107 so that the left border of the first window 710 are zero pixels offset from the left side of the display screen.

At a step 702, the video signal 123 is selected so that a primarily black second window 712 is drawn with a white horizontal line 714 stretching horizontally across the top of the second window 712 is displayed.

At a step 703, a VGA signal 107 is selected so that the first window 710 is uniformly black and has a 25% white horizontal line 716 stretching across the top of the first window 710. Thus, the pixels representing the 25% white horizontal line 716 are comprised of a red value is 25% of the maximum possible value, the green value is 25% of the maximum possible value, and the blue value is 25% of the maximum possible value.

At a step 704, the key color for the chromakey detector 205 is set to 25% white by setting the minimum red color at the D/A converter 206 to 25% of the maximum possible value, the minimum green color at the D/A converter 206 is set to 25% of the maximum possible value, and the minimum blue color at the D/A converter 206 is set to 25% of the maximum possible value.

And at step 705, the Piccolo Chip 119 is adjusted to create a video signal 123 having pixels matching the 25% white key color set for the chromakey detector 205 in step 704 so that the pulse detection circuit 216 detects a pulse.

MPEG picture 718 with a white horizontal line 720 is shown after completion of the above calibration steps.

Fine Pixel Clock Calibration

Figure 8A:
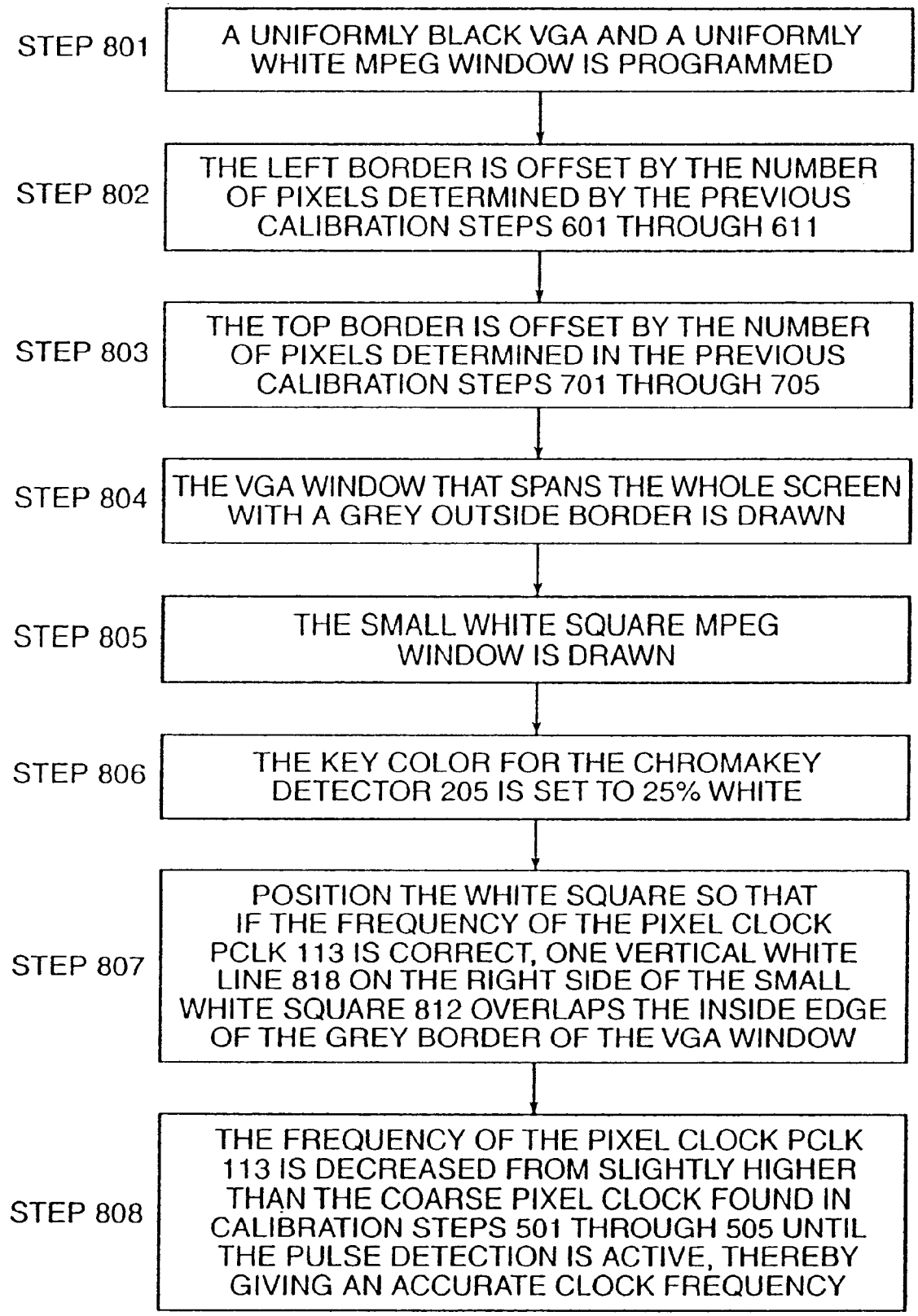
FIG. 8A shows a flowchart for mixing a VGA signal 107 with a video signal to perform the fine pixel clock calibration.

FIG. 8A shows a flowchart for mixing the VGA signal 107 with video signal 123 to perform the fine pixel clock calibration.

Figure 8B:
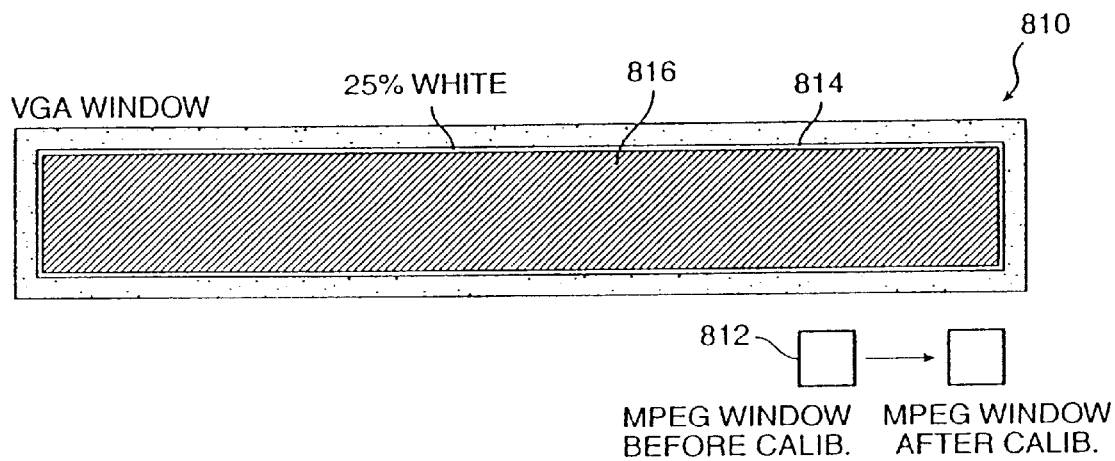
FIG. 8B shows a VGA signal 107 comprising a uniformly black VGA signal for filling a first window, and a video signal comprising a uniformly black for filling a second window.

FIG. 8B shows the VGA signal 107 comprising a uniformly black VGA signal for filling a first window 810, and the video signal 123 comprising a uniformly black for filling a second window 812.

Figure 8C:
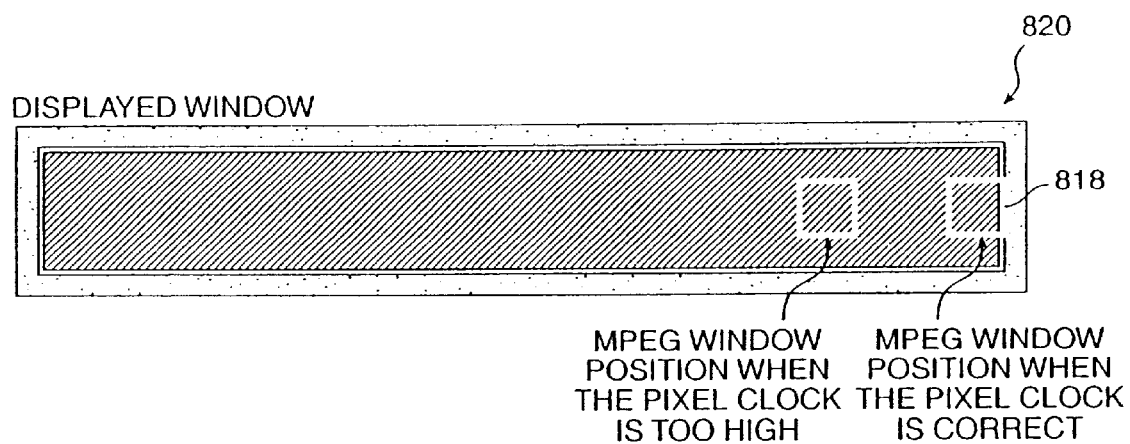
FIG. 8C shows the two signals after the fine adjustment of the pixel clock PCLK.

FIG. 8C shows the two signals after the fine adjustment of the pixel clock PCLK 113.

The VGA signal 107 comprises a VGA signal filling a rectilinear window on the display screen; this VGA signal is uniformly black in color (thus, it has zero red, green, and blue components). The second video signal 123 comprises an MPEG video signal which is also uniformly black in color.

As used herein, the term "window" includes any set of VGA or video data sized to fit in a selected set of pixels on the screen. Video data includes any stream of selected pixel data such as a pixel stream in the MPEG format.

In the preferred embodiment, the following steps are performed as part of the fine adjustment of the pixel clock frequency using PCLK 113.

At a step 801, a uniformly black VGA image is selected for input as the VGA signal 107, for filling a first window 810, and a uniformly white MPEG image is selected for input as the video signal, for filling a second window 812.

At a step 802, the left border is offset by the number of pixels determined by the previous calibration steps 701 through 708.

At a step 802, the top border is offset by the number of pixels determined in the previous calibration steps 701 through 706.

At a step 803, a first window 810 that spans the whole screen is drawn using the VGA signal 107.

At a step 804, a small white square 812 for the second window 812 is created using the video signal 123.

At a step 805, the key color for the chromakey detector 205 is set to 25% white by setting the minimum red color at the D/A converter 206 to 25% of the minimum possible value, the minimum green color at the D/A converter 206 is set to the minimum possible value, and the minimum blue color at the D/A converter 206 is set to the minimum possible value. This creates a grey border 814 around the first window 810.

At a step 806, the white square 812 created by the video signal 123 is offset by a number of pixels so that the white square 812 is positioned under the black area 816, so that if the frequency of the pixel clock PCLK 113 is correct, one vertical white line 818 on the right side of the small white square 812 overlaps the inside edge of the grey border of the first window area 820, as shown in FIG. 8C.

At a step 807, the frequency of the pixel clock PCLK 113 is decreased from slightly higher than the coarse pixel clock found in calibration steps 501 through 505 until the pulse detection is active, thereby giving an accurate clock frequency.

In the preferred embodiment of the present invention, the alignment detection circuit 216 senses the VGA RGS output 118 and is enabled for detection when VRDY 114 is at a logical "1" state. Once enabled, the alignment detection circuit 216 senses when the GREEN video signal exceeds a selected threshold voltage. In a preferred embodiment, the alignment detection circuit 216 detects a pulse any time the GREEN video signal exceeds 0.5 volts for more than a selected threshold time period, such as about 40 nanoseconds.

While preferred embodiments are disclosed herein, many variations are possible which remain within the concept and scope of the invention, and these variations would become clear to one of ordinary skill in the art after perusal of the specification, drawings and claims herein.

We claim:

1. A memory storing information including instructions executable by a processor to perform a method, said instructions including receiving a first analog video signal;

receiving a second analog video signal;

detecting a chromakey in said first analog video signal;

replacing at least a portion of said analog video signal with at least a portion of said second analog video signal in response to said chromakey;

outputting a resultant signal of said instruction for replacing; and adjusting a time delay, whereby the difference is minimized between a first time delay between said instruction for receiving said first analog video signal and said instruction for outputting, a second time delay between said instruction for receiving said second analog video signal and said instruction for outputting.

2. The memory of claim 1, further including instructions for receiving a clock signal; and detecting said resultant signal, said resultant signal including a plurality of horizontal lines each having a plurality of pixels, said pixels being responsive to said clock signal.

3. The memory of claim 2, wherein said resultant signal is periodic with a selected period;

said instruction for detecting is responsive to a pixel appearing at a selected location within said selected period; and said instruction for adjusting is operative to modify said clock signal.

4. The memory of claim 3, including an instruction for receiving a control signal, said control signal being indicative of a status of a said second analog video signal.

5. The memory of claim 4, wherein said instruction for replacing is responsive to said control signal.

6. The memory of claim 1, including an instruction for detecting said resultant signal, wherein said resultant signal includes a plurality of horizontal lines each having a plurality of pixels.

7. The memory of claim 6, wherein said resultant signal is periodic with a selected period;

said instruction for detecting is responsive to a pixel appearing at a selected location within said selected period; and said instruction for adjusting is responsive to said instruction for detecting.

8. The memory of claim 6, wherein said resultant signal is periodic with a selected period;

said instruction for detecting is responsive to at least one of said horizontal lines appearing at a selected location within said selected period; and said instruction for adjusting is responsive to said instruction for detecting.

9. The memory of claim 6, wherein said resultant signal is periodic with a selected period;

said pixels within said resultant signal define a plurality of vertical lines; and said instruction for detecting is responsive to at least one of said vertical lines appearing at a selected location within said selected period; and said instruction for adjusting is responsive to said instruction for detecting.

10. The memory of claim 1, wherein said instruction for adjusting includes storing a value in a register, said time delay being responsive to at least part of said register.

11. The memory of claim 10, wherein said time delay includes a time delay between said instruction for detecting a chromakey and said instruction for replacing.

12. The memory of claim 10, wherein said time delay includes a time delay between said instruction for receiving a first analog video signal and said instruction for detecting a chromakey.

13. The memory of claim 10, wherein said time delay includes a time delay between said instruction for receiving a first analog video signal and said instruction for replacing.

14. The memory of claim 10, wherein said time delay includes a time delay between said instruction for receiving a second analog video signal and said instruction for detecting a chromakey.

15. The memory of claim 10, wherein said time delay includes a time delay between said instruction for receiving a second analog video signal and said instruction for replacing.

16. The memory of claim 10, including instructions for receiving an MPEG signal; and decoding said MPEG signal to generate said second analog video signal.

17. The memory of claim 1 wherein said instruction for adjusting includes instructions for setting said first analog video signal to a first selected signal;

setting said second analog video signal to a second selected signal;

comparing said resultant signal with a selected video test signal; and controlling at least one time delay in response to said instruction for comparing.

18. The memory of claim 1 wherein said instruction for adjusting includes instructions for setting said first analog video signal to a first selected signal;

setting said second analog video signal to a second selected signal;

comparing said resultant signal with a selected test signal; and controlling at least one time delay to minimize a difference between said resultant signal and said selected video test signal.

19. The memory of claim 1, wherein said time delay includes a coarse time delay and a fine time delay.

* * * * *